(12) United States Patent
Hoshino et al.

(10) Patent No.: US 6,576,604 B1
(45) Date of Patent: *Jun. 10, 2003

(54) ADHESIVE CLEANING SHEET

(75) Inventors: Eiichi Hoshino, Tochigi (JP); Hironobu Sionome, Tochigi (JP); Koji Hanaoka, Tochigi (JP)

(73) Assignee: Kao Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/443,349

(22) Filed: Nov. 19, 1999

(30) Foreign Application Priority Data

Mar. 10, 1999 (JP) .......................... 11-063249

(51) Int. Cl.⁷ .......................... C11D 17/04; B32B 7/10
(52) U.S. Cl. .................. 510/438; 510/439; 510/238; 510/367; 510/378; 428/40.1; 428/40.2
(58) Field of Search .............. 510/438, 439, 510/238, 367, 378; 428/40.1, 40.2, 41.3, 41.5, 41.7, 41.8, 42.1, 42.3

(56) References Cited

U.S. PATENT DOCUMENTS

| | | | | |
|---|---|---|---|---|
| 4,259,383 A | * | 3/1981 | Eggensperger et al. | 428/72 |
| 4,348,293 A | * | 9/1982 | Clarke et al. | 252/90 |
| 4,416,791 A | * | 11/1983 | Haq | 510/296 |
| 4,515,703 A | * | 5/1985 | Haq | 510/135 |
| 4,532,063 A | | 7/1985 | Gueldenzopf | |
| 4,536,314 A | * | 8/1985 | Hardy et al. | 510/376 |
| 5,264,269 A | * | 11/1993 | Kakiuchi et al. | 428/156 |
| 5,780,418 A | * | 7/1998 | Niinaka et al. | 510/439 |
| 5,783,541 A | * | 7/1998 | Tack et al. | 510/224 |
| 5,811,107 A | * | 9/1998 | Gangadharan et al. | 424/401 |
| 5,863,887 A | * | 1/1999 | Gillette | 510/520 |
| 5,908,707 A | * | 6/1999 | Cabell et al. | 428/537.5 |
| 6,130,193 A | * | 10/2000 | Gillette | 510/295 |

FOREIGN PATENT DOCUMENTS

| | | |
|---|---|---|
| JP | 2-567330 | 10/1996 |
| JP | 2-633046 | 4/1997 |
| JP | 9-140647 | 6/1997 |
| JP | 10-179498 | 7/1998 |
| WO | 90/02166 | * 3/1990 |

* cited by examiner

*Primary Examiner*—Lorna M. Douyon
(74) *Attorney, Agent, or Firm*—Oblon, Spivak, McClelland, Maier & Neustadt, P.C.

(57) ABSTRACT

Disclosed is an adhesive cleaning sheet characterized by comprising a supporting sheet, a mold removing ingredient, and a water-soluble sheet, wherein the mold removing ingredient is covered with at least one of the supporting sheet and the water-soluble sheet, and the water-soluble sheet develops adhesiveness by at least one of hydrating and dissolving in water so that the cleaning sheet can be stuck to an object of cleaning by means of the water-soluble sheet and water on use.

13 Claims, 4 Drawing Sheets

ADHESIVE CLEANING SHEET

BACKGROUND OF THE INVENTION

1. Field of the Invention

This invention relates to an adhesive cleaning sheet having a simple structure which is very convenient for use, with which mold and dirt can be satisfactorily removed with ease and safety, and which has satisfactory storage stability.

2. Description of the Related Art

Mold or dirt forming in wet places, such as bathrooms and kitchens, has been removed by spraying or coating with a solution containing a mold removing ingredient, such as hypochlorous acid, and, after a prescribed period of time, washing away. This manner of cleaning involves the following problems. The liquid applied tends to run down or be scattered in other places having no mold or dirt. It may follow that a satisfactory cleaning effect is not achieved; walls, etc. may suffer from fading, and a powerful mold removing chemical, being scattered on spraying, could do harm to the body. Hence, it has been suggested that a sheet material impregnated with a solution is stuck to a wall by making use of the tension of the liquid. However, the sheet easily dries and separates because of a limited amount of the solution held therein. Besides, this manner of cleaning is not convenient because of involvement of the step of impregnating the sheet material with the solution.

In order to overcome these problems, Japanese Patent 2567330 and JP-A-9-140647 propose a sheet, etc. comprising a support, such as nonwoven, woven, or paper, which holds a bleaching ingredient thereon by means of an adhesive and/or brings a bleaching ingredient into contact with an object of cleaning by means of an adhesive. The disadvantage of these techniques lies in the poor storage stability, because the bleaching ingredient is deactivated with time in the co-presence of an adhesive.

JP-A-7-116235 proposes a solid chlorine ingredient holder comprising nonwoven, a sealing material, and a solid chlorine ingredient, in which the nonwoven has appropriately spaced depressions and sealing areas between adjacent depressions, the sealing material is joined to the sealing areas of the nonwoven, each depression being filled with a solid chlorine ingredient, and an adhesive layer is provided on the outer side of the sealing material.

JP-A-U-5-66001 proposes a mold removing sheet having a three-layer structure composed of a water-retention reactive layer containing a chlorine type bleaching agent capable of reacting with water to produce hypochlorous acid, an air-permeable film provided on one side of the water-retention reactive layer, and a gas barrier film provided on the other side. In this mold removing sheet the gas barrier film covers the back side of the water-retention reactive layer and the edges of the air-permeable film, and an adhesive layer is provided on the periphery of the air-permeable film.

However, the above-described mold and dirt removing sheets, and the like are disadvantageous in that the structure is complicated and formability is poor because, for one thing, an adhesive is used. Besides, they are not convenient for use.

SUMMARY OF THE INVENTION

Accordingly, an object of the present invention is to provide an adhesive cleaning sheet which has a simple structure containing no adhesive and is very convenient for use, with which mold and dirt can be satisfactorily removed with ease and safety, and which has satisfactory storage stability.

The above object is accomplished by providing an adhesive cleaning sheet characterized by having a supporting sheet, a mold removing ingredient, and a water-soluble sheet, wherein the mold removing ingredient is covered with at least one of the supporting sheet and the water-soluble sheet, and the water-soluble sheet develops adhesiveness on hydrating and/or dissolving in water so that the cleaning sheet may be stuck to an object of cleaning by means of the water-soluble sheet and water on use.

DESCRIPTION OF THE PREFERRED EMBODIMENT

The present invention will be described with reference to its preferred embodiments.

Figure 1:
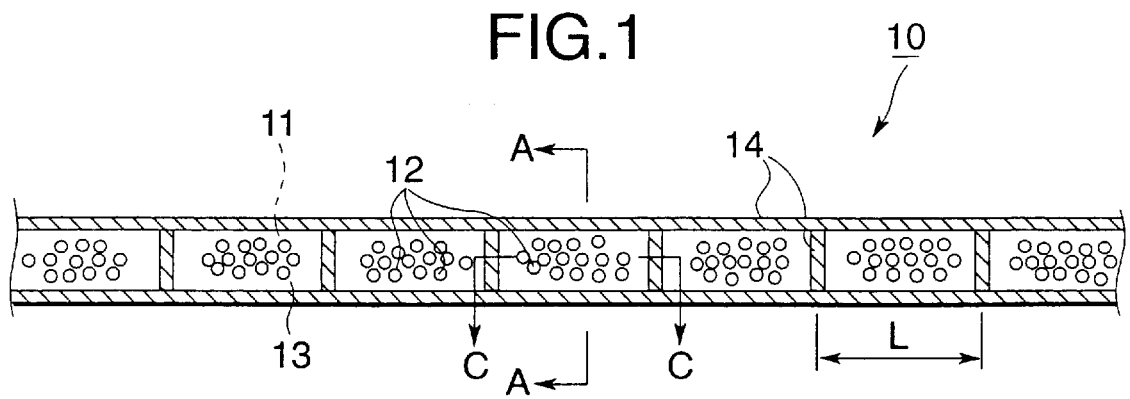
FIG. 1 is a plane view showing a first embodiment of the adhesive cleaning sheet according to the present invention.
Figure 2:
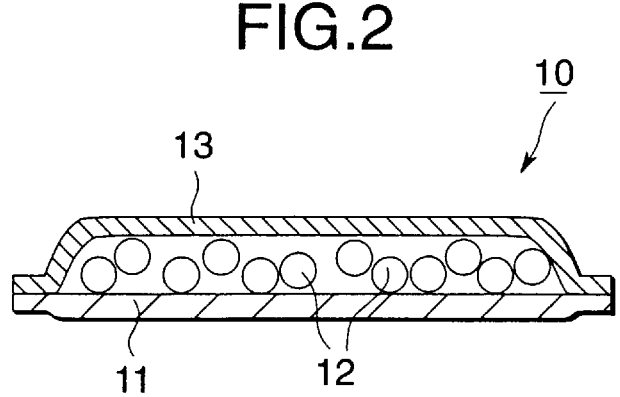
FIG. 2 is a cross-sectional view of FIG. 1, taken along line A—A.

FIG. 1 shows a plane view illustrating a first embodiment of the adhesive cleaning sheet according to the invention. FIG. 2 is a cross-sectional view of FIG. 1, taken along line A—A.

The adhesive cleaning sheet 10 according to the first embodiment is an adhesive cleaning sheet comprising a supporting sheet 11, a mold removing ingredient 12, and a water-soluble sheet 13. The mold removing ingredient 12 is covered and fixed between the supporting sheet 11 and the water-soluble sheet 13. The water-soluble sheet 13 develops adhesiveness upon hydrating and/or dissolving in water so that the adhesive cleaning sheet 10 may be stuck to an object of cleaning where mold or dirt forms by means of the water-soluble sheet 13 and water.

The supporting sheet 11 and the water-soluble sheet 13 have a continuous form with the same width. As shown in FIG. 1, the mold removing ingredient 12 is sandwiched in between the supporting sheet 11 and the water-soluble sheet 13. The supporting sheet 11 and the water-soluble sheet 13 are sealed by, for example, heat-sealing to form sealing members 14 dividing the adhesive cleaning sheet 10 into a large number of sections, in each of which the mold removing ingredient 12 is covered and fixed.

As shown in FIG. 1, the sealing members 14 are formed on both longitudinal sides of the supporting sheet 11 and the water-soluble sheet 13 and also across the width at regular intervals L. The sealing members 14 across the width are perforated (not shown) so that a requisite length may be torn off on use.

It is preferred for the supporting sheet 11 in the first embodiment to have liquid-permeability. The term "liquid-permeability" as used herein is intended to embrace a case in which the sheet itself is of a liquid-permeable material and a case in which the sheet itself is impermeable to liquid but made liquid-permeable by, for example, making holes for allowing liquid to pass through. The sheeting material forming the supporting sheet 11 includes paper, nonwoven, woven, knitted fabric, film, sponge and other flexible substrates. The supporting sheet 11 made of these materials is favorable in that the mold removing ingredient 12 can be impregnated with liquid such as water almost uniformly and over the whole area by showering, etc., thereby making good use of the effect of the mold removing ingredient 12.

The supporting sheet 11 preferably has a basis weight of 5 to 200 g/m$^2$, particularly 10 to 100 g/m$^2$.

The mold removing ingredient 12 includes components capable of mold removal, bleaching, sterilization, disinfection, deodorizing, and the like. Specific examples of such components are chlorine type bleaching ingredients, such as sodium dichloroisocyanurate, sodium trichloroisocyanurate, chlorinated lime (high granules), dichloromethyl hydantoin, bromochlorodimethyl hydantoin, and calcium chlorite; and oxygen type bleaching ingredients which are combinations of (i) sodium percarbonate or sodium perborate and (ii) a component selected from the group consisting of an organic peracid precursor (e.g., tetraacetylethylenediamine, succinic anhydride, a sodium alkanoyloxybenzenesulfonate, a sulfonate represented by formula (1) or (2) shown below), an lytic enzyme (e.g., cellulase, hemicellulase, xylanase, pectinesterase, polygalacturonase, pectinlyase, glucosidase, galactosidase, mannosidase, arabinofuranosidase, mannase, β-1,3-glucanase, α-1,3-glucanase, laminarinase, and protease), an oxidoreductase, etc. From the standpoint of the odor given off during cleaning operation, oxygen type bleaching ingredients are preferred.

Where an organic acid precursor is used as a mold removing ingredient 12, it is preferred to use a chelating agent as a stabilizer for the organic peracid produced.

(1)

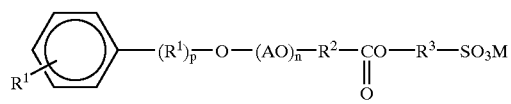

wherein R$^1$ represents a hydrogen atom, a straight-chain or branched alkyl group having 1 to 10 carbon atoms, an alkenyl group or an acyl group; R$^2$ represents a straight-chain or branched alkylene group having 1 to 8 carbon atoms or a phenylene group which may be substituted with a straight-chain or branched alkyl group having 1 to 5 carbon atoms; R$^3$ represents a straight-chain or branched alkylene group having 1 to 8 carbon atoms; R$^4$ represents a straight-chain or branched alkylene group having 1 to 5 carbon atoms; p represents 0 or 1; A represents an alkylene group having 2 to 4 carbon atoms; n represents a number of from 1 to 100; the n A's may be the same or different; and M represents an alkali metal atom, an alkaline earth metal atom, ammonium, alkylammonium or alkanolammonium.

(2)

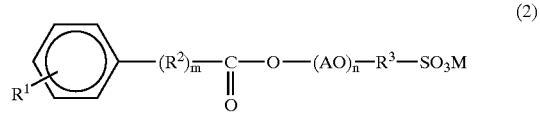

wherein R$^1$ represents a hydrogen atom, a straight-chain or branched alkyl group having 1 to 10 carbon atoms, an acyl group or an alkoxy group; R$^2$ represents a straight-chain or branched alkylene group having 1 to 16 carbon atoms or a group represented by formula: —(R$^4$)$_p$—O—R$^5$— (wherein R$^4$ and R$^5$, which may be the same or different, each represent a straight-chain or branched alkylene group having 1 to 8 carbon atoms; and p represents 0 or 1); R$^3$ represents a straight-chain or branched alkylene group having 1 to 8 carbon atoms; A represents an alkylene group having 2 to 4 carbon atoms; m represents 0 or 1; n represents a number of from 0 to 100; the n A's may be the same or different; and M represents an alkali metal atom, an alkaline earth metal atom, ammonium, alkylammonium, or alkanolammonium.

Of the sulfonates represented by formula (2) preferred are those in which R$^1$ is a hydrogen atom or a straight-chain or branched alkyl group having 4 or less carbon atoms, an acyl group or an alkoxy group; R$^2$ is a straight-chain or branched alkylene group having 1 to 8 carbon atoms or a group of formula: —(R$^4$)$_p$—O—R$^5$— (wherein R$^4$ and R$^5$, which may be the same or different, each represent a straight-chain or branched alkylene group having 1 to 4 carbon atoms; and p represents 0 or 1); M represents an alkali metal atom; and n is a number of from 0 to 20.

The amount of the mold removing ingredient 12 to be used is selected in accordance with the kind. For example, in using an oxygen type bleaching ingredient, sodium percarbonate or sodium perborate is preferably used in such an amount to give an effective oxygen concentration of 0.1% by weight or more, particularly 0.5% by weight or more, and an organic peracid precursor is preferably used in a molar ratio of 1/1000 or more, particularly 1/500 or more, to the sodium percarbonate or sodium perborate when a bleaching solution (a liquid containing the mold removing ingredient 12 which exudes from the adhesive cleaning sheet 10 on applying tap water, etc.; hereinafter the same) is brought into contact with an object to be cleaned.

In using a chlorine type bleaching ingredient, on the other hand, it is preferably used in such an amount to give an effective chlorine concentration of 0.1% by weight or more, particularly 1% by weight or more, when the bleaching solution is brought into contact with the surface to be cleaned. If the amount of the mold removing ingredient 12 is less than the above-described lower limit, the adhesive cleaning sheet 10 tends to fail to exhibit sufficient capability of removing mold or dirt. Specifically, the mold removing ingredient 12 is preferably used in an amount of 0.005 g or more per cm$^2$ of the supporting sheet.

Taking formability and convenience for use into consideration, the adhesive cleaning sheet 10 of the first embodiment is preferably constituted so that the mold removing ingredient 12 between the supporting sheet 11 and the water-soluble sheet 13 may have a thickness of 5 mm or less, particularly 3 mm or less.

The water-soluble sheet 13 develops adhesiveness on hydrating and/or dissolving in water. When used, the adhesive cleaning sheet 10 is stuck to the surface to be cleaned by means of water previously present on that surface to dissolve the mold removing ingredient 12 in that water and, if necessary, water applied afterward to the adhesive cleaning sheet 10 whereby the water-soluble sheet 13 becomes gel. Thus the adhesive cleaning sheet 10 can hold on the surface for a while as retaining water therein. It is preferred for the water-soluble sheet 13 not to disintegrate easily when touched by wet fingers on use and to be peeled easily after passage of a given time.

Materials of the water-soluble sheet 13 are not particularly limited as long as they have the above-described properties. Preferred examples are film and nonwoven made of (i) polymers having a salt-forming group, (ii) nonionic water-soluble polymers, (iii) naturally occurring water-soluble polymers such as gelatin, casein, etc., (iv) emulsion polymers such as an acrylic resin emulsion, and (v) crosslinked products of the polymers (i) to (iv).

The basis weight of the water-soluble sheet 13 is decided so that the adhesive cleaning sheet 10 may become sticky to a surface to be cleaned on use by means of the water-soluble sheet 13 and water. From the standpoint of formability of the adhesive cleaning sheet 10, bleaching performance on use, and the convenience for use, a preferred basis weight is 1 to 100 g/m$^2$, particularly 2 to 50 g/m$^2$.

The adhesive cleaning sheet 10 of the first embodiment preferably has a total thickness of 10 mm or less, particularly 5 mm or less.

The second to sixth embodiments of the adhesive cleaning sheet according to the present invention are then described. In the following embodiments, the same reference numerals are given to the same members as used in the first embodiment, and the same description as given to the first embodiment applies to the matter not explained hereinafter.

Figure 3:
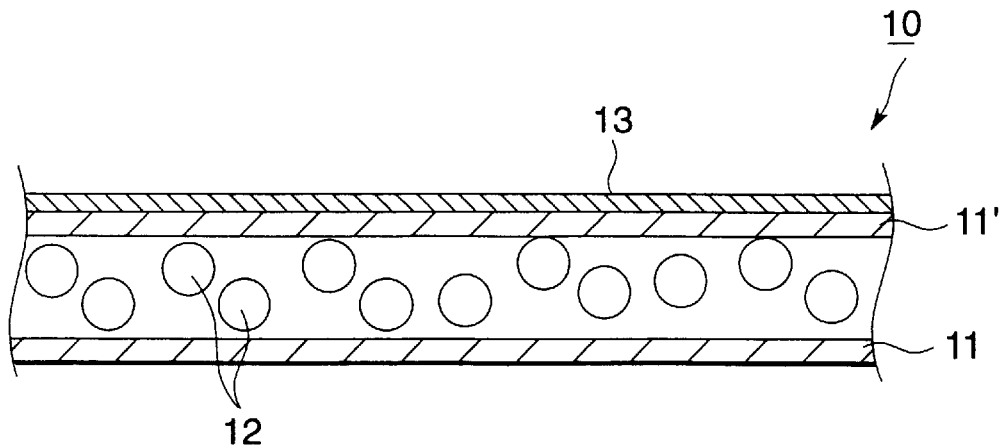
FIG. 3 is a cross-sectional view (corresponding to FIG. 2) showing the central portion in the width direction of a second embodiment of the adhesive cleaning sheet according to the present invention.

As shown in FIG. 3, the adhesive cleaning sheet 10 according to the second embodiment additionally has a second supporting sheet 11' on the inner side of the water-soluble sheet 13 in the first embodiment. To have such a second supporting sheet 11' produces the following advantages (1) to (3). (1) The outside moisture is blocked so that the mold removing ingredient has improved stability with time. (2) When the sheet is removed from a wall, the water-soluble sheet is easily peeled together with the second supporting sheet, hardly remaining on the wall. (3) Where the water-soluble sheet is highly soluble, the second supporting sheet holds the water-soluble sheet dissolved in water, suppressing the flow and running.

The second supporting sheet 11' is the same as the supporting sheet 11 in the first embodiment in form, material, and basis weight.

Figure 4:
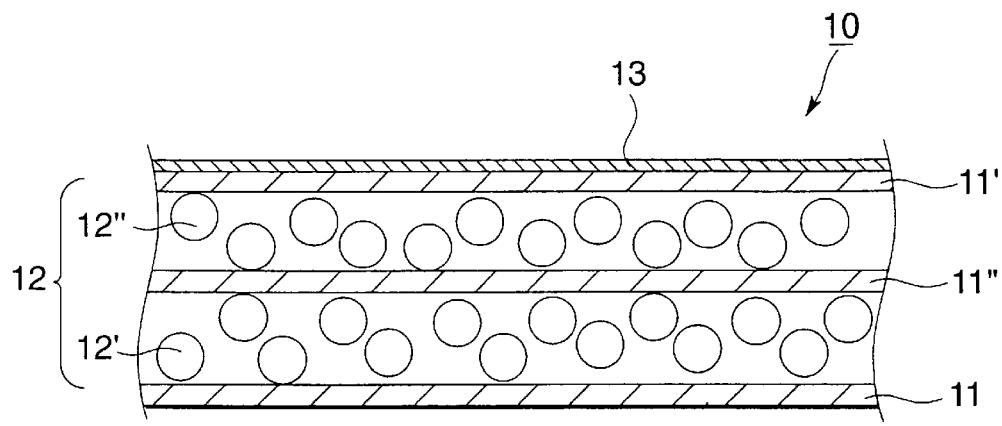
FIG. 4 is a cross-sectional view (corresponding to FIG. 2) showing the central portion in the width direction of a third embodiment of the adhesive cleaning sheet according to the present invention.

As shown in FIG. 4, the adhesive cleaning sheet 10 according to the third embodiment additionally has a third supporting sheet 11" in the middle between the supporting sheet 11 and the second supporting sheet 11' of the second embodiment and uses an oxygen type bleaching ingredient composed of a first ingredient 12' and a second ingredient 12" as the mold removing ingredient 12 used in the second embodiment. The first ingredient 12' and the second ingredient 12" are separated apart by the third supporting sheet 11", the first ingredient 12' being held between the supporting sheet 11 and the third supporting sheet 11", and the second ingredient 12" between the third supporting sheet 11" and the second supporting sheet 11'.

Of the oxygen type bleaching ingredients (mold removing ingredient 12), divided by the third supporting sheet 11", the first ingredient 12' is selected from sodium percarbonate and sodium perborate, while the second one 12" is selected from the group consisting of an organic peracid precursor, an lytic enzyme, and an oxidoreductase. To separate the first ingredient 12' and the second ingredient 12" composing the oxygen type bleaching ingredient as a mold removing ingredient 12 by the third supporting sheet 11" is advantageous in the following points. (1) Since the first and the second ingredients are kept out of contact before use of the adhesive cleaning sheet of the invention, they are prevented from reacting with each other and thereby exhibit improved stability with time. 2) Where the second ingredient has poor solubility as is often the case with an organic peracid precursor, dissolution of the second ingredient is accelerated by the aqueous solution of the first ingredient that is disposed on the side to be watered as compared with the case where water is applied directly to the second ingredient, whereby the rate and speed of production of a peracid increase.

The third supporting sheet 11" is the same as the supporting sheet 11 in the first embodiment in form, material, and basis weight.

With reference to the amounts of the first ingredient 12' and the second ingredient 12", the amount of the oxygen type bleaching ingredient used as a mold removing ingredient 12 in the first embodiment (i.e., sodium percarbonate or sodium perborate plus the organic acid precursor) can be mentioned as an example.

The thickness of the first ingredient 12' (the thickness of the first ingredient 12' between the supporting sheet 11 and the third supporting sheet 11") is preferably 3 mm or less, particularly 2 mm or less. The thickness of the second ingredient 12" (the thickness of the second ingredient 12" between the third supporting sheet 11" and the second supporting sheet 11') is preferably 3 mm or less, particularly 2 mm or less. The total thickness of the first ingredient 12' and the second ingredient 12" is approximately the same as that of the mold removing ingredient 12 in the first embodiment (the thickness of the mold removing ingredient 12 between the supporting sheet 11 and the water-soluble sheet 13).

Figure 5:
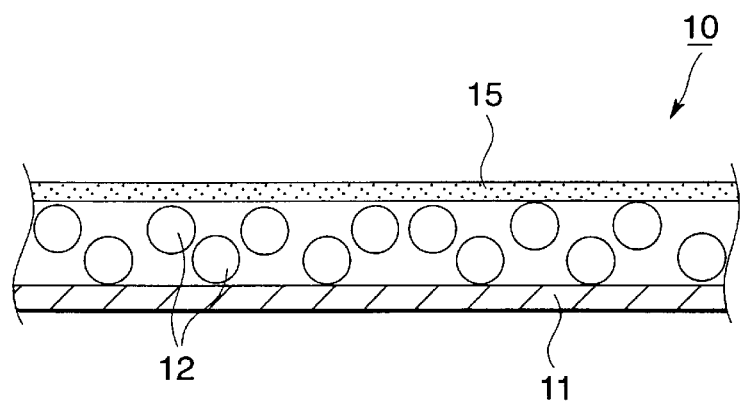
FIG. 5 is a cross-sectional view (corresponding to FIG. 2) showing the central portion in the width direction of a fourth embodiment of the adhesive cleaning sheet according to the present invention.

As shown in FIG. 5, the fourth embodiment of the adhesive cleaning sheet of the present invention uses a water-soluble sheet impregnated with a water-soluble polymer in place of the water-soluble sheet 13 as used in the first embodiment. The water-soluble sheet 15 used in the adhesive cleaning sheet 10 of the fourth embodiment has the same properties as those of the water-soluble sheet 13 used in the first embodiment.

The sheeting material used in the water-soluble sheet 15 includes the one capable of being impregnated with, or of holding, a water-soluble polymer such as paper, nonwoven, woven, knitted fabric, sponge, and other flexible substrates. The water-soluble polymer used in the water-soluble sheet 15 includes the one capable of forming the film or nonwoven useful as the water-soluble sheet 13 in the first embodiment.

The amount of the water-soluble polymer to be held in the water-soluble sheet 15 is preferably 10 to 200 parts by weight, particularly 20 to 150 parts by weight, per 100 parts by weight of nonwoven.

The water-soluble sheet 15 is obtained by applying a solution of a water-soluble polymer in a solvent (e.g., water, an aqueous alcohol solution) to nonwoven followed by drying.

The basis weight of the water-soluble sheet 15 is selected so that the adhesive cleaning sheet 10 may become sticky to a surface to be cleaned on use by means of the water-soluble sheet 15 and water. From the viewpoint of formability of the adhesive cleaning sheet 10, bleaching performance on use, and the convenience for use, a preferred basis weight is 10 to 400 g/m$^2$, particularly 20 to 300 g/m$^2$.

The sheet substrate making the water-soluble sheet 15 may be the sheet, such as nonwoven, made up of a water-soluble polymer recited as a specific example for the water-soluble sheet 13 of the first embodiment.

Figure 6:
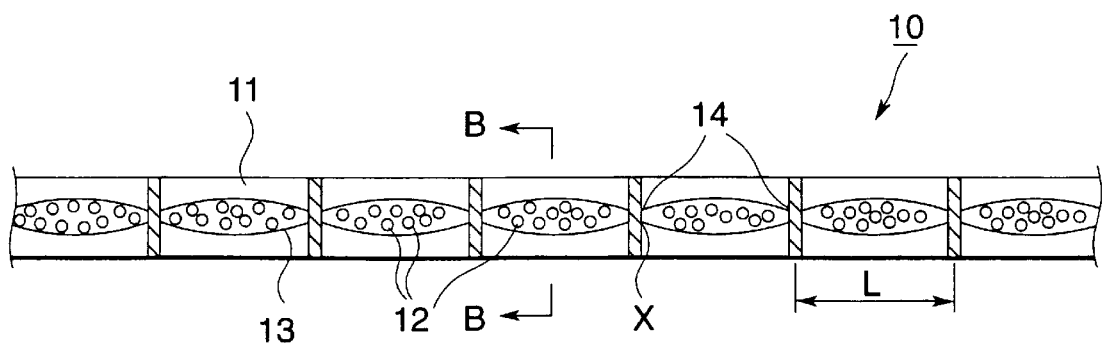
FIG. 6 is a plane view showing a fifth embodiment of the adhesive cleaning sheet according to the present invention.
Figure 7:
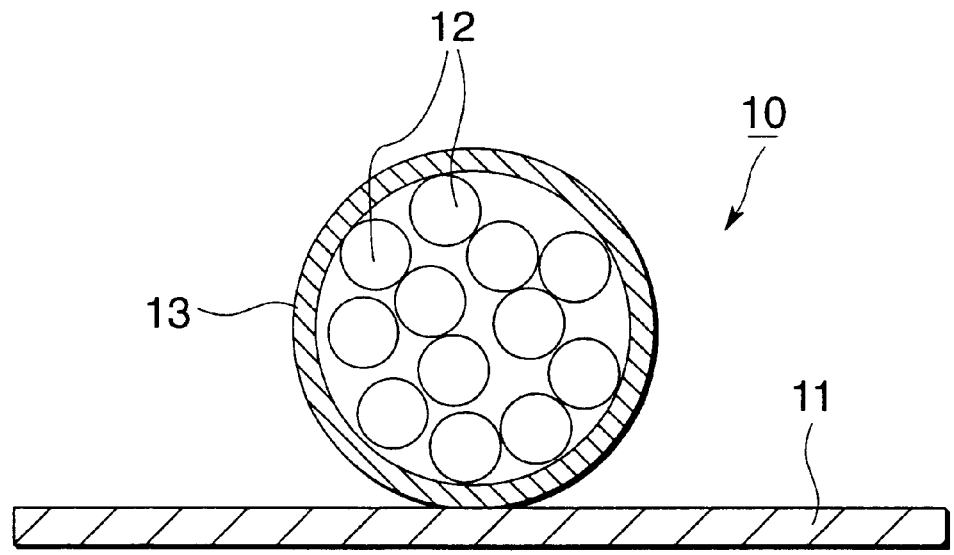
FIG. 7 is a cross-sectional view of FIG. 6, taken along line B—B.

FIG. 6 is a plane view showing the fifth embodiment of the adhesive cleaning sheet of the present invention, and FIG. 7 is a cross-sectional view of FIG. 6, taken along line B—B.

As shown in FIG. 6, the adhesive cleaning sheet 10 of the fifth embodiment has the mold removing ingredient 12 wrapped in the water-soluble sheet 13 and fixed to the supporting sheet 11 by sealing members 14 formed by, for example, heat sealing the water-soluble sheet 13 and the supporting sheet 11. As shown in FIG. 6, a large number of the sealing members 14 are provided on the central portion X in the width direction at regular intervals L. The mold removing ingredient 12 is scattered on the water-soluble sheet 13 of continuous length, and the water-soluble sheet 13 is rolled and twisted at the regular intervals.

The adhesive cleaning sheet according to the present invention is not restricted to the aforementioned embodiments, and various changes and modifications can be made therein without departing from the spirit and scope of the present invention.

While the supporting sheet of the adhesive cleaning sheet of the invention is preferably a liquid-permeable sheet, it does not always need to be liquid permeable because water previously present on a wall infiltrates the water-soluble sheet and the mold removing ingredient.

The second supporting sheet 11' in the adhesive cleaning sheet 10 of the second embodiment (FIG. 3) may be replaced with a water-soluble sheet, which can be the same as the water-soluble sheet 13 or the water-soluble sheet 15 in the fourth embodiment.

The second supporting sheet 11' and/or the third supporting sheet 11" in the adhesive cleaning sheet 10 of the third embodiment (FIG. 4) may be replaced with a water-soluble sheet, which can be the same as the water-soluble sheet 13 or the water-soluble sheet 15 in the fourth embodiment.

The arrangement of the first ingredient 12' and the second ingredient 12" as the mold removing ingredient 12 in the adhesive cleaning sheet 10 of the third embodiment may be reversed. That is, the first ingredient 12' can be held between the third supporting sheet 11" and the second supporting sheet 11', and the second ingredient 12" between the supporting sheet 11 and the third supporting sheet 11".

In the adhesive cleaning sheet 10 of the third embodiment, the second supporting sheet 11' on the inner side of the water-soluble sheet 13 may be omitted.

The adhesive cleaning sheet 10 of the fourth embodiment (FIG. 4) may have a third supporting sheet 11" in the middle between the supporting sheet 11 and the water-soluble sheet 15 impregnated with a water-soluble polymer in the same manner as in the third embodiment.

Figure 10:
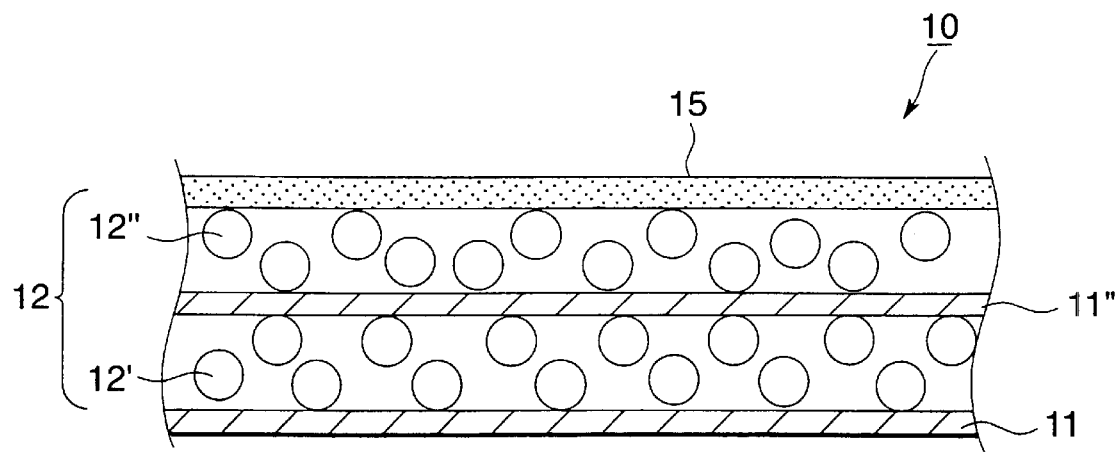
FIG. 10 is a cross-sectional view (corresponding to FIG. 2) showing the central portion in the width direction of a sixth embodiment of the adhesive cleaning sheet according to the present invention.

In this case, an oxygen type bleaching ingredient composed of a first ingredient 12' and a second ingredient 12" is used as the mold removing ingredient 12, and the first ingredient 12' and the second ingredient 12" are separated apart by the third supporting sheet 11". The first ingredient 12' is held between the supporting sheet 11 and the third supporting sheet 11", and the second ingredient 12" between the third supporting sheet 11" and the water-soluble sheet 15 impregnated with a water-soluble polymer. This embodiment, referred to a sixth embodiment, is illustrated in FIG. 10.

The third supporting sheet 11" in the adhesive cleaning sheet 10 of the sixth embodiment (FIG. 10) may be replaced with a water-soluble sheet. The water-soluble sheet can be the same as the water-soluble sheet 13 or the water-soluble sheet 15 in the forth embodiment.

Figure 8:
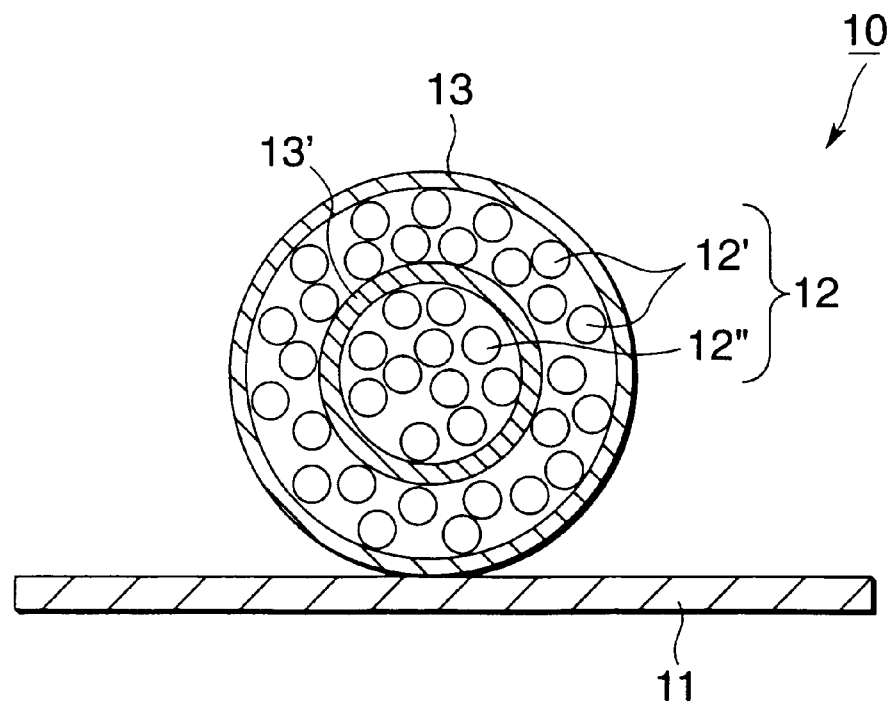
FIG. 8 is a cross-sectional view (corresponding to FIG. 7) showing another embodiment of the adhesive cleaning sheet according to the present invention, taken along the width direction.

The adhesive cleaning sheet 10 of the fifth embodiment (FIGS. 6 and 7) may have a second water-soluble sheet 13' inside the water-soluble sheet 13 as shown in FIG. 8. In this embodiment, an oxygen type bleaching ingredient composed of a first ingredient 12' and a second ingredient 12" is used as the mold removing ingredient 12, and the first ingredient 12' and the second ingredient 12" are separated apart by the second water-soluble sheet 13'. The second ingredient 12" is wrapped in the inner second water-soluble sheet 13', and the first ingredient 12' is held between the second water-soluble sheet 13' and the outer water-soluble sheet 13. The second water-soluble sheet 13' used in this embodiment may be replaced with a second supporting sheet 11'. The arrangement of the first ingredient 12' and the second ingredient 12" as the mold removing ingredient 12 may be reversed.

In the adhesive cleaning sheet 10 of the fifth embodiment, the arrangement of the supporting sheet 11 and the water-soluble sheet 13 may be reversed. That is, the mold removing ingredient 12 is wrapped in the supporting sheet 11, and the supporting sheet 11 and the water-soluble sheet 13 are heat-sealed to form sealing members 14, by which the supporting sheet 11 is fixed on the water-soluble sheet 13. The mold removing ingredient 12 is scattered on the supporting sheet 11 of continuous length, and the supporting sheet 11 is rolled and twisted at the regular intervals.

The above-described adhesive cleaning sheet of the present invention may have a second supporting sheet inside the supporting sheet 11. In this case, an oxygen type bleaching ingredient comprising a first ingredient 12' and a second ingredient 12" is used as the mold removing ingredient 12, and the first ingredient 12' and the second ingredient 12" are separated apart by the second supporting sheet. One of the first ingredient 12' and the second ingredient 12" is wrapped in the second supporting sheet. The second supporting sheet used in this embodiment may be replaced with a second water-soluble sheet.

In the adhesive cleaning sheet of the present invention, the mold removing ingredient may be fixed onto at least one of the supporting sheet and the water-soluble sheet with an adhesive, such as a hydrophilic adhesive comprising the above-mentioned water-soluble polymer, a rubber adhesive, an acrylic adhesive, a solution adhesive, an aqueous adhesive, or a calender-coating adhesive.

Figure 9:
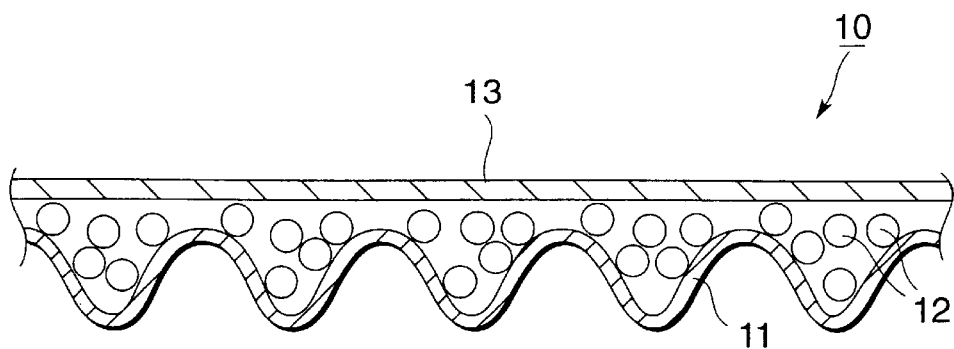
FIG. 9 is a cross-sectional view (corresponding to FIG. 2) showing the central portion in the width direction of still another embodiment of the adhesive cleaning sheet according to the present invention, or a cross-sectional view showing the central portion in the longitudinal direction of FIG. 1, taken along line C—C.

The supporting sheet of continuous length used in the adhesive cleaning sheet of the present invention may have an uneven profile as shown in FIG. 9. FIG. 9 shows the central portion of the cross section of FIG. 1, taken along line C—C or line A—A, preferably line C—C.

The supporting sheet and/or the water-soluble sheet of adhesive cleaning sheet of the present invention can be a sheet having high water-retention and carrying a hydrophilic group which develops adhesiveness on hydrating, such as a sheet made of carboxymethylated rayon, carboxymethylated pulp, etc.

The adhesive cleaning sheet of the present invention can be of wide cut lengths as well as continuous lengths shown in FIG. 1. Further, for convenient use, the adhesive cleaning sheet of the present invention can be supplied as a roll of a continuous sheet, which, on use, can be unrolled and tore at the perforation to give a desired length.

The manner of using the adhesive cleaning sheet according to the present invention will then be illustrated by referring to removal of mold or dirt on the joints of tiles in a bathroom (the surface to be cleaned) with the adhesive cleaning sheet 10 of the first embodiment.

A predetermined length of the adhesive cleaning sheet 10 is tore off at the perforation. The joints and the vicinities gathering mold or dirt are wetted with water beforehand. The water-soluble sheet 13 of the adhesive cleaning sheet 10 is brought into contact with the joints and pressed from the side of the supporting sheet 11, whereby the part of the water-soluble sheet 13 is hydrated and/or dissolved in water, and the adhesive cleaning sheet 10 is thus kept stuck to the joints. Then, water is applied by, for example, showering tap water thereon to sufficiently dissolve and apply the mold removing ingredient 12 to the joints. The mold or dirt can be removed by allowing the adhesive cleaning sheet 10 to stand in this state for a given period of time and peeling the sheet 10 from the joints.

In this manner, the adhesive cleaning sheet 10 of the first embodiment is very convenient for use, being capable of removing mold or dirt through simple and easy operations of tearing off the sheet, watering a surface to be cleaned, bringing the sheet into contact with the surface to be cleaned, watering the sheet, and peeling the sheet.

Since the mold removing ingredient 12 can be kept in continuous contact with the joints while wet, the action of the mold removing ingredient 12 can be exerted effectively. Thus, mold or dirt could be removed satisfactorily even in using, as the mold removing ingredient 12, an oxygen type bleaching ingredient which is weaker at mold or dirt removing performance than a chlorine type bleaching ingredient.

It is possible for the mold removing ingredient 12 to manifest its effect even in the state before watering by, for example, showering with tap water because it has been impregnated with water previously applied to the joints.

The above-described manner of use applies to the adhesive cleaning sheets according to the other embodiments.

As stated above, the adhesive cleaning sheet 10 of the present invention is extremely convenient for use, having a simple structure and being designed to adhere to an object of cleaning by means of the water-soluble sheet 13, which develops adhesiveness upon hydrating and/or dissolving in water, and water on use.

Since the mold removing ingredient 12 of the adhesive cleaning sheet 10 of the present invention is brought into contact with an object of cleaning while being covered and fixed with the supporting sheet 11 and the water-soluble sheet 13, the cleaning operation is not accompanied by scatter of the mold removing ingredient 12. The adhesive cleaning sheet 10 of the invention is of high safety in this respect. Since the adhesive cleaning sheet 10 of the present invention hardly let the liquid run down, the mold removing ingredient 12 can be brought into contact with an object of cleaning in a higher concentration than in the conventional cleaning operation thereby to remove mold or dirt effectively.

While the adhesive cleaning sheet 10 according to the present invention is capable of removing mold or dirt forming on places other than walls and wet places as a matter of course, it is particularly useful for cleaning walls and shows its convenience especially in cleaning wet places. It can be stuck to the inner surface of a garbage can, etc. expecting the effects of sterilization, disinfection and deodorizing. It can also be stuck to the stained or dirty area of clothing to be washed in a washing machine to remove the stains easily.

The adhesive cleaning sheet according to the present invention has a simple structure without using an adhesive and is very convenient for use, with which mold and dirt can be satisfactorily removed with ease and safety, and which has satisfactory storage stability.

What is claimed is:

1. An adhesive cleaning sheet, comprising:
a supporting sheet which is liquid-permeable, a mold removing ingredient and a water-soluble sheet, wherein said mold removing ingredient is confined by at least one of the supporting sheet and the water-soluble sheet, and wherein said water-soluble sheet as an outer confining sheet develops adhesiveness by virtue of being hydrated, dissolved or both in water thereby adhering to an object to be cleaned by means of said water-soluble sheet and water on use, but being dry prior to hydration which develops adhesiveness.

2. The adhesive cleaning sheet according to claim 1, wherein said mold removing ingredient is held between said supporting sheet and said water-soluble sheet.

3. The adhesive cleaning sheet according to claim 1, wherein a second supporting sheet is provided in contact with the inner side of said water-soluble sheet.

4. The adhesive cleaning sheet according to claim 1, wherein said water-soluble sheet is impregnated with a water-soluble polymer.

5. The adhesive cleaning sheet according to claim 1, wherein said mold removing ingredient is confined by said water-soluble sheet and fixed on said supporting sheet.

6. The adhesive cleaning sheet according to claim 1, wherein said mold removing ingredient is confined by said supporting sheet and fixed on said water-soluble sheet.

7. The adhesive cleaning sheet according to claim 1, wherein said supporting sheet and said water-soluble sheet are sealed in such a manner as to make a large number of sections in which said mold removing ingredient is separately confined and fixed.

8. The adhesive cleaning sheet according to claim 1, wherein said mold removing ingredient is fixed to at least one of said supporting sheet and said water-soluble sheet with an adhesive.

9. The adhesive cleaning sheet according to claim 1, wherein at least one of said supporting sheet and said water-soluble sheet has an uneven profile.

10. The adhesive cleaning sheet according to claim 1, wherein at least one of said supporting sheet and said water-soluble sheet is a sheet having high water-retention and carrying a hydrophilic group which develops adhesiveness upon hydration.

11. The adhesive cleaning sheet according to claim 1, wherein said mold removing ingredient is wrapped in said water-soluble sheet and fixed to said supporting sheet by sealing members provided on a central portion in the width direction at regular intervals along said supporting sheet, and wherein said mold removing ingredient is scattered on said water-soluble sheet of continuous length, and said water-soluble sheet is rolled and twisted at said regular intervals.

12. The adhesive cleaning sheet according to claim 1, wherein said mold removing ingredient is wrapped in said supporting sheet and fixed to said water-soluble sheet by sealing members provided on a central portion in the width direction at regular intervals along said water-soluble sheet, and wherein said mold removing ingredient is scattered on said supporting sheet of continuous length, and said supporting sheet is rolled and twisted at said regular intervals.

13. An adhesive cleaning sheet, comprising:

a layered structure of a supporting sheet which is liquid-permeable and a water-soluble sheet, with a mold removing ingredient, which is an oxygen containing bleaching agent comprising a first ingredient of sodium percarbonate or sodium perborate and a second ingredient of an organic peracid precursor, a lytic enzyme or an oxidoreductase, layered therebetween, and a third supporting sheet in between said sheets which is positioned so that it separates said first ingredient and said second ingredient, wherein said water-soluble sheet develops adhesiveness by virtue of being hydrated, dissolved or both in water so that the cleaning sheet adheres to an object to be cleaned by means of said water-soluble sheet and water on use.

* * * * *